United States Patent
Kitagawa

(10) Patent No.: US 10,075,684 B2
(45) Date of Patent: Sep. 11, 2018

(54) IMAGE DISPLAY DEVICE AND METHOD OF CONTROLLING SAME

(71) Applicant: SEIKO EPSON CORPORATION, Tokyo (JP)

(72) Inventor: Taku Kitagawa, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/881,963

(22) Filed: Jan. 29, 2018

(65) Prior Publication Data

US 2018/0220115 A1 Aug. 2, 2018

(30) Foreign Application Priority Data

Feb. 1, 2017 (JP) ................... 2017-016573

(51) Int. Cl.
*H04N 9/31* (2006.01)

(52) U.S. Cl.
CPC ......... *H04N 9/3182* (2013.01); *H04N 9/3105* (2013.01); *H04N 9/315* (2013.01)

(58) Field of Classification Search
CPC .... H04N 9/3182; H04N 9/3105; H04N 9/315; H04N 9/3197; H04N 9/31; H04N 9/3111; H04N 9/3129
USPC ....... 348/739, 744–747, 750, 758, 806, 807; 345/589, 613
See application file for complete search history.

(56) References Cited

U.S. PATENT DOCUMENTS

| | | | | |
|---|---|---|---|---|
| 6,480,242 B1 * | 11/2002 | Okada | ................. | H04N 3/2335 348/807 |
| 6,989,872 B2 * | 1/2006 | Nakatsuji | ............. | H04N 3/2335 348/746 |
| 2009/0122070 A1 | 5/2009 | Aragaki et al. | | |
| 2009/0141255 A1 | 6/2009 | Yoshizawa | | |

FOREIGN PATENT DOCUMENTS

| | | |
|---|---|---|
| JP | 2009-122156 A | 6/2009 |
| JP | 2009-134069 A | 6/2009 |

* cited by examiner

*Primary Examiner* — Sherrie Hsia
(74) *Attorney, Agent, or Firm* — Oliff PLC

(57) ABSTRACT

A pixel displacing correction section performs a pixel displacing correction adapted to shift a position of the sub-pixel in the display target image on the image signal of the sub-pixel supplied to a plurality of light modulators to thereby compensate position shifts of the display positions of the sub-pixels constituting the images of the respective color components to be displayed on the display surface with respect to a reference position. A boundary correction section decreases the luminance represented by the image signal of the sub-pixel of another color component of the pixel, to which the sub-pixel belongs, with respect to the sub-pixel having completely moved outside the effective display range due to the pixel displacing correction.

6 Claims, 9 Drawing Sheets

| A'=0.42A<br>+0.28B<br>+0.18E<br>+0.12F<br>A ← A' | B'=0.42B<br>+0.28C<br>+0.18F<br>+0.12G<br>B ← B' | C'=0.42C<br>+0.28D<br>+0.18G<br>+0.12H<br>C ← C' | D'=0.42D<br>+ ....<br>+0.18H<br>+ ....<br>D ← D' |
|---|---|---|---|
| E'=0.42E<br>+0.28F<br>+0.18I<br>+0.12J<br>E ← E' | F'=0.42F<br>+0.28G<br>+0.18J<br>+0.12K<br>F ← F' | G'=0.42G<br>+0.28H<br>+0.18K<br>+0.12L<br>G ← G' | H'=0.42H<br>+ ....<br>+0.18L<br>+ ....<br>H ← H' |
| I'=0.42I<br>+0.28J<br>+0.18M<br>+0.12N<br>I ← I' | J'=0.42J<br>+0.28K<br>+0.18N<br>+0.12O<br>J ← J' | K'=0.42K<br>+0.28L<br>+0.18O<br>+0.12P<br>K ← K' | L'=0.42L<br>+ ....<br>+0.18P<br>+ ....<br>L ← L' |
| M'=0.42M<br>+0.28N<br>....<br>M ← M' | N'=0.42N<br>+0.28O<br>....<br>N ← N' | O'=0.42O<br>+0.28P<br>....<br>O ← O' | P'=0.42P<br>....<br>P ← P' |

FIG. 7

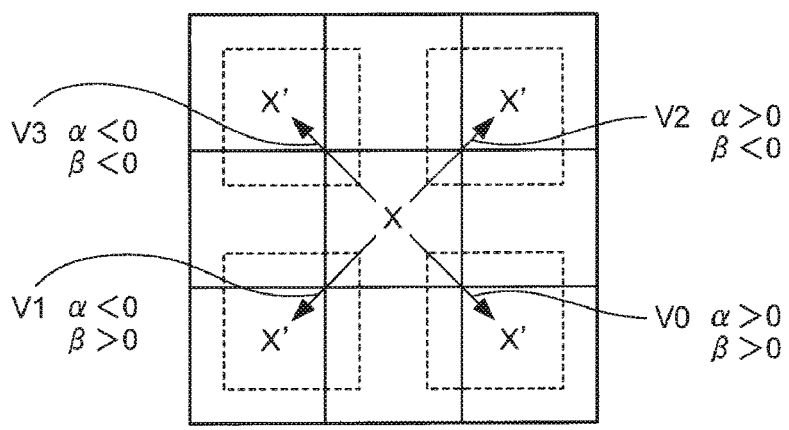

FIG. 8

| F 0.42 | G 0.70 | H 0.70 |
|---|---|---|
| J 0.60 | K 1.00 | L 1.00 |
| N 0.60 | O 1.00 | P 1.00 |

IMAGE DISPLAY DEVICE AND METHOD OF CONTROLLING SAME

CROSS-REFERENCE

The entire disclosure of Japanese Patent Application No. 2017-016573, filed Feb. 1, 2017 is expressly incorporated by reference herein.

BACKGROUND

1. Technical Field

The present invention relates to an image display device such as a projector, and a method of controlling the image display device.

2. Related Art

The image display device such as a projector is provided with a light modulator such as a liquid crystal light valve or a mirror device for each of the color components of R (red), G (green), and B (blue) of a display target image. Further, image signals of sub-pixels of the respective color components of R, G, and B constituting a plurality of pixels in the display target image are provided to the light modulators corresponding respectively to the color components, and output light beams of the respective light modulators are combined with each other via an optical system to irradiate a display surface. In such a manner, the images of the respective sub-pixels different in color component are displayed on the display surface in an overlapping manner.

Here, if the number of pixels of a display image by the projector is increased, positioning of each of the sub-pixels by the optical system tends to become difficult. For example, a projection lens provided to the projector has chromatic aberration, and the refractive index thereof varies with the wavelength. Therefore, high aberration accuracy is required with respect to the optical system provided to the projector. However, it is difficult to accurately adjust all of the display positions of the sub-pixels constituting one pixel. Therefore, there occurs position shift in which the display positions of the sub-pixels corresponding to the respective color components are shifted from the reference positions.

The direction and the distance of such a position shift of the sub-pixel are generally different between the sub-pixels of the respective color components corresponding to the same pixel. Therefore, there occurs a problem that the original color represented by the image signal is not displayed.

Therefore, in the technology described in JP-A-2009-122156 (Document 1), it is arranged that the position shifts of the display positions from the reference positions are obtained with respect to the sub-pixels of the display target image, and a pixel displacing correction based on the position shifts is performed on the image signal to be supplied to the respective light modulators to thereby perform compensation of the position shifts of the display positions of the sub-pixels. Here, in the pixel displacing correction, by performing an interpolation operation using the image signals of the respective sub-pixels of the display target image, there are generated image signals obtained by moving the images of the respective sub-pixels in opposite directions to the directions of the position shifts and as much as the same distances as the distances of the position shifts, respectively.

Incidentally, when performing the pixel displacing correction described above, a part or the whole of the sub-pixels located in the vicinity of the boundary of the effective display range in the display target image is located outside the effective display range, and is therefore not displayed, and the display luminance of the sub-pixels decreases in some cases. In this case, in the case in which sub-pixels of other color components belonging to the same pixel as the sub-pixel are located within the effective display range, and there is no decrease in display luminance, there is a problem that coloring occurs in the pixel.

In order to solve this problem, there is adopted, in some cases, a measure of disposing superfluous pixels (hereinafter referred to as parting pixels) outside the effective display range in addition to the pixels in the effective display range. In the example shown in FIG. 14, there are disposed two parting pixels Mi outside the effective display range with respect to each of the color components of R, G, and B. In this case, since it is possible to display the image of the sub-pixels having been located outside the effective display range using the parting pixels Mi due to a pixel displacing correction, it is possible to prevent coloring of the pixels in the vicinity of the boundary of the effective display range from occurring. In the example shown in FIG. 15, the pixel displacing correction is not performed with respect to the G component, and the pixel displacing correction for matching the display positions of the sub-pixels with the display positions of the sub-pixels of the G component is performed with respect to each of the R component and the B component. In this example, since in FIG. 14, the sub-pixels of the R component are shifted as much as 1 pixel to the left with respect to the sub-pixels of the G component, there is performed the pixel displacing correction for moving the image signal of the R component as much as 1 pixel to the right as shown in FIG. 15 using the parting pixels Mi located on the right side of the sub-pixels (the N-th sub-pixels) located on the right end of the effective display range. Further, in this example, since in FIG. 14, the sub-pixels of the B component are shifted as much as 2 pixels to the right with respect to the sub-pixels of the G component, there is performed the pixel displacing correction for moving the image signal of the B component as much as 2 pixels to the left as shown in FIG. 15 using the two parting pixels Mi located on the left side of the sub-pixels (the first sub-pixels) located on the left end of the effective display range.

However, in order to adopt this measure, it is necessary to provide elements corresponding to the parting pixels outside the effective display range to the light modulator such as a liquid crystal light valve or a mirror device in addition to the elements corresponding to the pixels in the effective display range.

For example, in the case of the liquid crystal light valve compatible with 1080 p, there are 1920×1080 pixels in the effective display range. If it is attempted to add two parting pixels in each of upper, lower, right, and left directions outside the effective display range, the total number of pixels increases to 1924×1084. As described above, in the case of providing the parting pixels in order to prevent the coloring, it is necessary to provide the light modulators with the element corresponding to the parting pixels, and there arises a problem that the light modulators grow in size accordingly. Further, in the case of not using the parting pixels for the image display, the light irradiation on the elements corresponding to the parting pixels in the light modulator is not blocked, but the image signal to be supplied to the elements corresponding to the parting pixels is only changed to an image signal corresponding to black display. Therefore, there arises a problem that a black frame corresponding to the parting pixels performing the black display is visually recognized depending on the contrast of the display target image. Due to such circumstances, there also exist a lot of projectors not provided with the parting pixels.

However, when performing the pixel displacing correction in the projector not provided with the parting pixels, there arises a problem of coloring in the vicinity of the boundary of the effective display range described above. FIG. 16 shows a problem, which arises in the case of not providing the parting pixels Mi in the situation shown in FIG. 14 and FIG. 15. In this example, since the parting pixels Mi do not exist, the sub-pixel (the N-th pixel) on the right end of the R component is placed outside the effective display range due to the pixel displacing correction, and is therefore not displayed. Further, the two sub-pixels (the first and second sub-pixels) on the left end of the B component are placed outside the effective display range due to the pixel displacing correction, and are therefore not displayed. Therefore, in the case of, for example, displaying the effective display range with solid white, the central part thereof becomes a white display area 200W, but a yellow display area 200Y having a stripe shape with a width of two pixels occurs at the left end, and a blue display area 200B having a stripe shape with a width of one pixel occurs at the right end.

Therefore, in the past, there has been required a measure of using the projector without providing the parting pixels to the projector, and while allowing the occurrence of the coloring in the vicinity of the boundary of the effective display range, or a measure of providing a small number of parting pixels to the projector to limit the pixel displacing correction within the range determined in accordance with the number of parting pixels.

SUMMARY

An advantage of some aspects of the invention is to provide an image display device and a control method thereof capable of preventing the occurrence of the coloring in the vicinity of the boundary of the effective display range due to the pixel displacing correction without using the parting pixels.

An aspect of the invention provides an image display device including an image display having a plurality of light modulators corresponding respectively to color components, adapted to output light beams, which are modulated by image signals of a plurality of sub-pixels corresponding respectively to the color components and belonging to each of pixels constituting a display target image, by the respective light modulators, adapted to combine output light beams of the respective light modulators with each other, and adapted to display images formed of the respective color components on a display surface so as to overlap each other, and an image signal correction unit adapted to perform a pixel displacing correction adapted to shift a position of the sub-pixel in the display target image on the image signal of the sub-pixel supplied to at least one of the light modulators to thereby compensate position shifts of the display positions of the sub-pixels constituting the images of the respective color components to be displayed on the display surface with respect to a reference position, wherein the image signal correction unit having a boundary correction unit adapted to perform a boundary correction of decreasing luminance represented by the image signal of a sub-pixel of another color component of the pixel, to which the sub-pixel belongs, with respect to the sub-pixel, which moves outside an effective display range due to the pixel displacing correction.

According to this aspect of the invention, the boundary correction unit performs the boundary correction of decreasing the luminance represented by the image signal of a sub-pixel of another color component of the pixel, to which the sub-pixel belongs, with respect to the sub-pixel, which moves outside the effective display range to have display luminance one of equal to and lower than the predetermined value due to the pixel displacing correction. As a result of the execution of the boundary correction, it is possible to prevent the coloring of the pixel from occurring due to the decrease in display luminance caused by the pixel displacing correction of the sub-pixel.

In the image display device according to the aspect of the invention, it is preferable that the boundary correction unit decreases the luminance represented by the image signal of the sub-pixel of another color component of the pixel, to which the sub-pixel moving completely outside the effective display range to have the display luminance equal to 0 due to the pixel displacing correction belongs, to a level no higher than 10%.

In the image display device according to the aspect of the invention, it is preferable that the boundary correction unit corrects the luminance represented by the image signal of the sub-pixel of another color component of the pixel, to which the sub-pixel moving completely outside the effective display range to have the display luminance equal to 0 due to the pixel displacing correction belongs, to a luminance value corresponding to black display.

In another preferred aspect of the invention, the invention is implemented as a method of controlling an image display device having a plurality of light modulators corresponding respectively to color components, adapted to output light beams, which are modulated by image signals of a plurality of sub-pixels corresponding respectively to the color components and belonging to each of pixels constituting a display target image, by the respective light modulators, adapted to combine output light beams of the respective light modulators with each other, and adapted to display images formed of the respective color components on a display surface so as to overlap each other, the method including the steps of obtaining a position shift of a display position from a reference position in the display surface of the sub-pixel of the display target image, making the image display device perform a process of performing a pixel displacing correction adapted to shift a position of the sub-pixel in the display target image on the image signal of the sub-pixel supplied to at least one of the light modulators to thereby compensate position shifts of the display positions of the sub-pixels constituting the images of the respective color components to be displayed on the display surface with respect to a reference position, and making the image display device perform a boundary correction of decreasing luminance represented by the image signal of a sub-pixel of another color component of the pixel, to which the sub-pixel belongs, with respect to the sub-pixel, which moves outside an effective display range due to the pixel displacing correction.

According to this aspect of the invention, since the boundary correction of decreasing the luminance represented by the image signal of a sub-pixel of another color component of the pixel, to which the sub-pixel belongs, is performed with respect to the sub-pixel, which moves outside the effective display range to have display luminance one of equal to and lower than the predetermined value due to the pixel displacing correction, it is possible to prevent the coloring of the pixel from occurring due to the decrease in the display luminance of the sub-pixel caused of the pixel displacing correction.

BRIEF DESCRIPTION OF THE DRAWINGS

The invention will be described with reference to the accompanying drawings, wherein like numbers reference like elements.

FIG. 7 is a diagram illustrating pixel displacing correction parameters used in the pixel displacing correction.

FIG. 8 is a diagram for explaining a discrimination method of a position shift direction of the sub-pixel performed in the pixel displacing correction.

DESCRIPTION OF EXEMPLARY EMBODIMENTS

Figure 1:
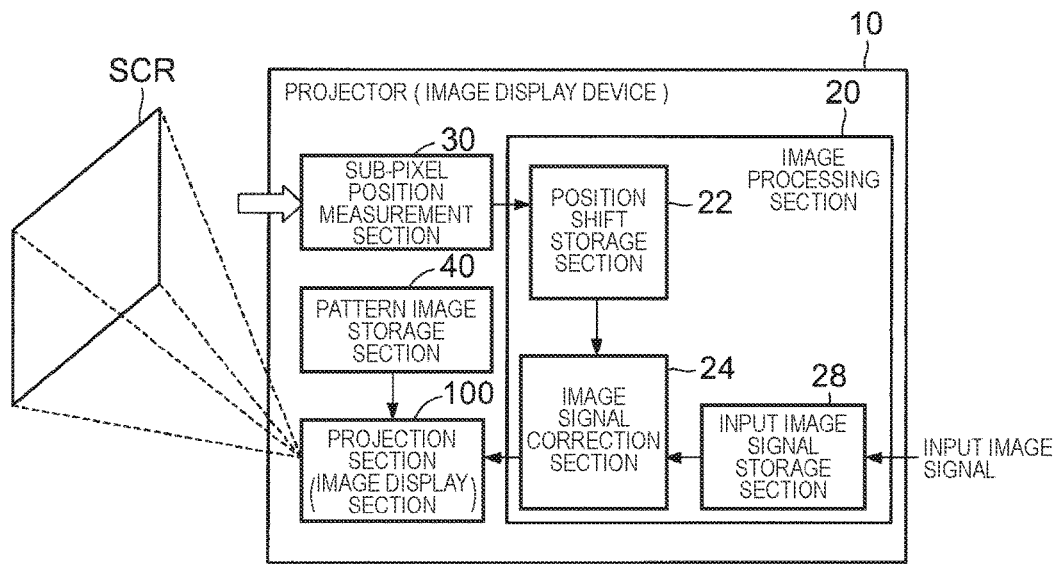
FIG. 1 is a block diagram showing a configuration example of a projector as a first embodiment of an image display device according to the invention.

FIG. 1 is a block diagram showing a configuration example of a projector as an embodiment of an image display device according to the invention.

The projector 10 according to the present embodiment projects the light, which is modulated based on image signals of a plurality of sub-pixels constituting one pixel, on a screen SCR as a display surface to thereby perform image display. The projector 10 includes an image processing section 20, a pattern image storage section 40, a sub-pixel position measurement section 30, and a projection section 100 as an image display section.

The image processing section 20 performs a correction process corresponding to the position shifts (or position shift vectors) of the display positions of the sub-pixels, which constitute each of the pixels of the image projected on the screen SCR, from reference positions to an input image signal for each of sub-pixels from an image signal generation device (not shown). The position shifts of the sub-pixels are calculated from a measurement result of the sub-pixel position measurement section 30. The pattern image storage section 40 stores a pattern image for measuring the positions of the sub-pixels of the projection image (display image) to the screen SCR. The sub-pixel position measurement section 30 includes an imaging device such as a digital still camera, and takes an image, which has been projected on the screen SCR by the projection section 100 using the pattern image stored in the pattern image storage section 40, and then measures the positions of the sub-pixels constituting each of the pixels using the taken image data as image information. The positions of the sub-pixels measured by the sub-pixel position measurement section 30 are used for calculation of the position shifts with reference to the predetermined reference positions in the projection image to the screen SCR by the image processing section 20.

The image processing section 20 includes a position shift storage section 22, an image signal correction section 24, and an input image signal storage section 28. The position shift storage section 22 stores the information representing the position shifts of the sub-pixels measured by the sub-pixel position measurement section 30 with reference to the given reference positions in the projection image (display image) to the screen SCR.

The input image signal storage section 28 stores the input image signals from an image signal generation device not shown. The image signal correction section 24 corrects the input image signals of the sub-pixels stored in the input image signal storage section 28 in accordance with the position shifts of the display positions of the sub-pixels. The input image signals to be the processing target of the image signal correction section 24 are the image signals on which the gamma correction has been performed, and includes the information representing the display luminance of the sub-pixels of the respective color components.

The image signals from the image signal correction section 24 described above are input to the projection section 100. The projection section 100 is formed of, for example, a three-panel type liquid crystal projector, and projects an image on the screen SCR using the light having been modulated based on the image signals of the sub-pixels constituting one pixel.

Figure 2:
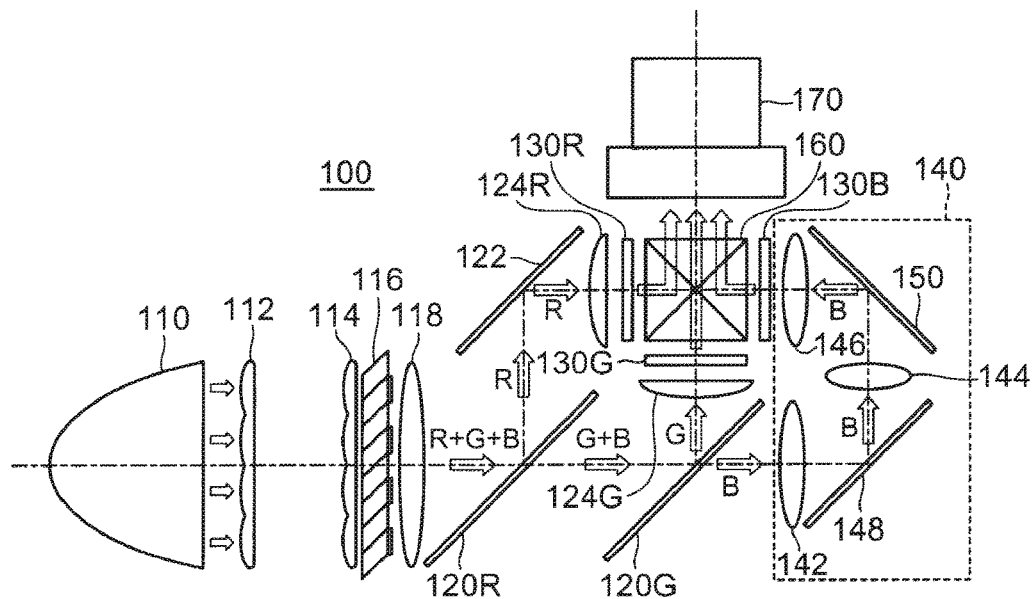
FIG. 2 is a diagram showing a configuration example of a projection section of the projector.

FIG. 2 shows a configuration example of the projection section 100 shown in FIG. 1. In FIG. 2, although the description is presented assuming that the projection section 100 of the present embodiment is formed of a so-called three-panel liquid crystal projector, the projection section of the image display device according to the invention is not limited to what is formed of the so-called three-panel liquid crystal projector.

The projection section 100 includes a light source 110, integrator lenses 112, 114, a polarization conversion element 116, an overlapping lens 118, an R dichroic mirror 120R, a G dichroic mirror 120G, a reflecting mirror 122, an R field lens 124R, a G field lens 124G, an R liquid crystal panel 130R (a first light modulation section), a G liquid crystal panel 130G (a second light modulation section), a B liquid crystal panel 130B (a third light modulation section), a relay optical system 140, a cross dichroic prism 160, and a projection lens 170. Liquid crystal panels used as the R liquid crystal panel 130R, the G liquid crystal panel 130G, and the B liquid crystal panel 130B are each a transmissive liquid crystal display device. The relay optical system 140 includes relay lenses 142, 144, 146, and reflecting mirrors 148, 150.

The light source 110 is formed of, for example, a super high-pressure mercury lamp, and emits light including at least light of the R component, light of the G component, and light of the B component. The integrator lens 112 has a plurality of small lenses for dividing the light from the light source 110 into a plurality of partial light beams. The integrator lens 114 has a plurality of small lenses corresponding respectively to the small lenses of the integrator lens 112. The overlapping lens 118 overlaps the partial light beams emitted from the small lenses of the integrator lens 112.

Further, the polarization conversion element 116 has a polarization splitting film and a λ/2 plate, and converts p-polarized light into s-polarized light by transmitting the p-polarized light while reflecting the s-polarized light. The overlapping lens 118 is irradiated with the s-polarized light from the polarization conversion element 116.

The light overlapped by the overlapping lens 118 enters the R dichroic mirror 120R. The R dichroic mirror 120R has a function of reflecting the light of the R component while transmitting the light of the G component and the light of the B component. The G dichroic mirror 120G is irradiated with the light having been transmitted through the R dichroic mirror 120R, and the light having been reflected by the R dichroic mirror 120R is reflected by the reflecting mirror 122 to be guided to the R field lens 124R.

The G dichroic mirror 120G has a function of reflecting the light of the G component while transmitting the light of the B component. The light having been transmitted through the G dichroic mirror 120G enters the relay optical system 140, while the light having been reflected by the G dichroic mirror 120G is guided to the G field lens 124G.

The relay optical system 140 corrects the difference in optical path length between the light of the B component having been transmitted through the G dichroic mirror 120G and the other light, namely the light of the R component and the light of the G component, using the relay lenses 142, 144, 146 in order to reduce the differences in the optical path length as much as possible. The light having been transmitted through the relay lens 142 is guided by the reflecting mirror 148 to the relay lens 144. The light having been transmitted through the relay lens 144 is guided by the reflecting mirror 150 to the relay lens 146. The light having been transmitted through the relay lens 146 is applied to the B liquid crystal panel 130B.

The light having been applied to the R field lens 124R is converted into parallel light, and enters the R liquid crystal panel 130R. The R liquid crystal panel 130R functions as the light modulation element (the light modulation section), and is arranged to have the transmission (penetration, or modulation rate) varied in accordance with the R image signal (the image signal of the sub-pixels of a first color component). Therefore, the light (the light of the first color component) having entered the R liquid crystal panel 130R is modulated in accordance with the R image signal, and the light thus modulated enters the cross dichroic prism 160.

The light having been applied to the G field lens 124G is converted into parallel light, and then enters the G liquid crystal panel 130G. The G liquid crystal panel 130G functions as the light modulation element (the light modulation section), and is arranged to have the transmission (penetration, or modulation rate) varied in accordance with the G image signal (the image signal of the sub-pixels of a second color component). Therefore, the light (the light of the second color component) having entered the G liquid crystal panel 130G is modulated in accordance with the G image signal, and the light thus modulated enters the cross dichroic prism 160.

The B liquid crystal panel 130B, which is irradiated with the light converted by the relay lenses 142, 144, and 146 into the parallel light, functions as the light modulation element (the light modulation section), and is arranged to have the transmission (penetration, or modulation rate) varied in accordance with the B image signal (the image signal of the sub-pixels of a third color component). Therefore, the light (the light of the third color component) having entered the B liquid crystal panel 130B is modulated in accordance with the B image signal, and the light thus modulated enters the cross dichroic prism 160.

The R liquid crystal panel 130R, the G liquid crystal panel 130G, and the B liquid crystal panel 130B each have substantially the same configuration. The liquid crystal panels are each obtained by encapsulating a liquid crystal material as an electro-optic material between a pair of transparent glass plates, and modulate the penetration of the light of the respective colors in accordance with the image signals of the sub-pixels using, for example, poly-silicon thin film transistors as switching elements.

The cross dichroic prism 160 has a function of outputting the composite light, which is obtained by combining the incident light from the R liquid crystal panel 130R, the incident light from the G liquid crystal panel 130G, and the incident light from the B liquid crystal panel 130B with each other, as outgoing light. The projection lens 170 is a lens for imaging the output image on the screen SCR in an enlarged manner, and has a function of zooming or reducing the image in accordance with the zoom magnification.

Figure 3:
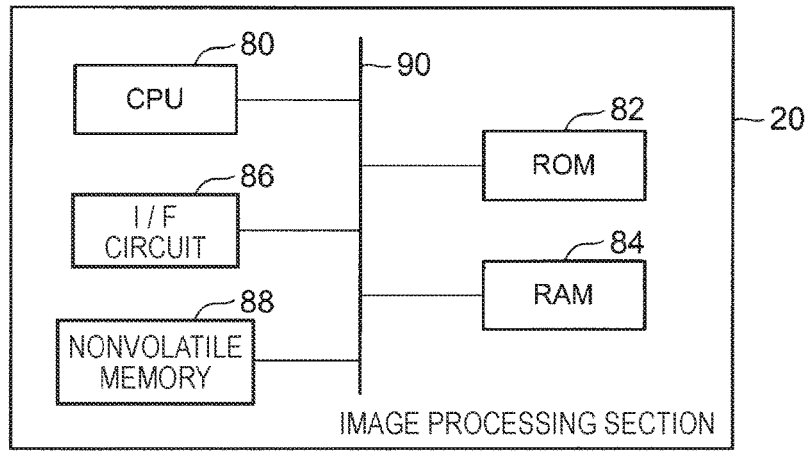
FIG. 3 is a block diagram showing a hardware configuration of an image processing section of the projector.

FIG. 3 is a block diagram showing a hardware configuration example of the image processing section 20 in the present embodiment.

The image processing section 20 includes a central processing unit (CPU) 80, a read only memory (ROM) 82, a random access memory (RAM) 84, an interface (I/F) circuit 86, and a nonvolatile memory 88 formed of an electrically erasable programmable read-only memory (EEPROM) or the like. The CPU 80, the ROM 82, the RAM 84, the I/F circuit 86 and the nonvolatile memory 88 are connected to each other via a bus 90.

The ROM 82 stores a program, and it is possible for the CPU 80 having read the program via the bus 90 to perform a process corresponding to the program. The RAM 84 acts as a working memory for the CPU 80 to perform the process, and temporarily stores the program to be read by the CPU 80. The I/F circuit 86 performs an interface process of the input image signal from the outside. The nonvolatile memory 88 is used as a storage device for a variety of types of control parameters.

The function of the image signal correction section 24 shown in FIG. 1 is realized by the CPU 80, which reads the program stored in the ROM 82 or the RAM 84 via the bus 90, and executes the program. The function of the position shift storage section 22 shown in FIG. 1 is realized by the nonvolatile memory 88 or the RAM 84. The function of the input image signal storage section 28 shown in FIG. 1 is realized by the I/F circuit 86 or the RAM 84.

Figure 4:
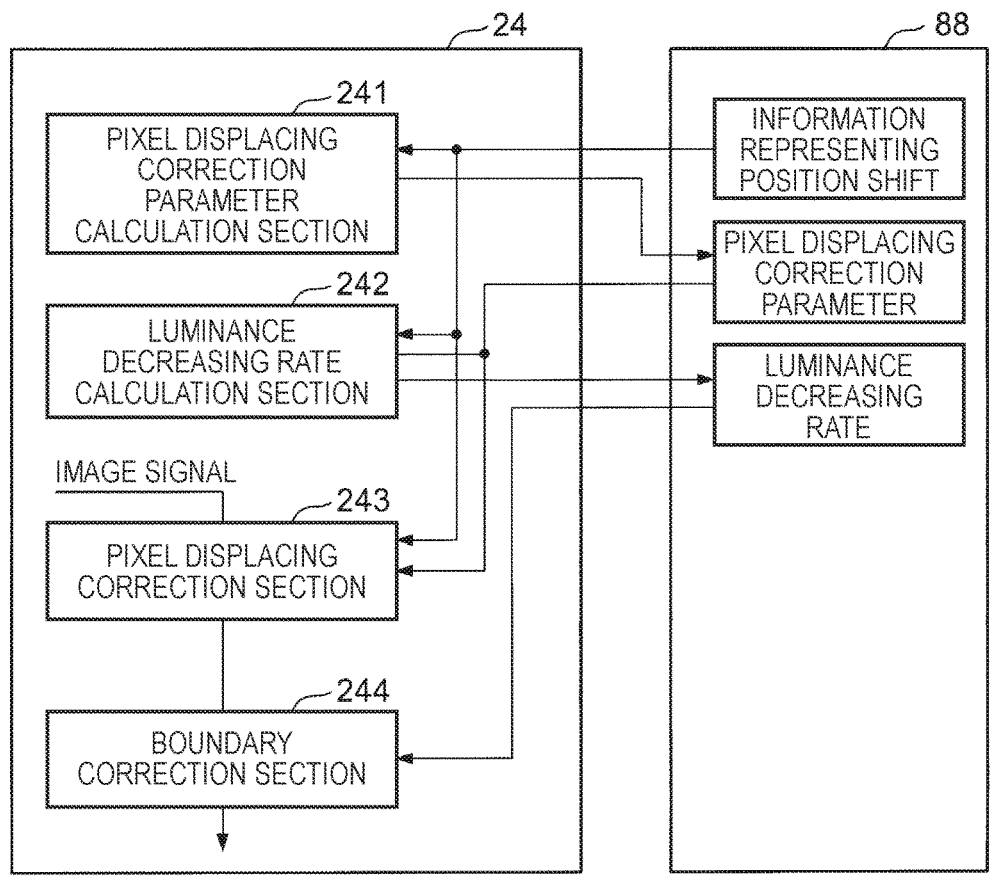
FIG. 4 is a block diagram showing a functional configuration of an image signal correction section of the projector.

FIG. 4 is a block diagram showing a detailed functional configuration of the image signal correction section 24. As shown in FIG. 4, the function of the image signal correction section 24 can roughly be classified into a pixel displacing correction parameter calculation section 241, a luminance decreasing rate calculation section 242, a pixel displacing correction section 243, and a boundary correction section 244.

Here, the process of the pixel displacing correction parameter calculation section 241 and the process of the luminance decreasing rate calculation section 242 are performed at a timing preceding the image display by the projector 10 such as an inspection before factory shipment of the projector 10 or a periodic inspection of the projector 10. Further, the process of the pixel displacing correction section 243 and the process of the boundary correction section 244 are performed when the projector 10 performs the image display.

The pixel displacing correction parameter calculation section 241 is a process of calculating the pixel displacing correction parameters necessary for the execution of the pixel displacing correction by the pixel displacing correction section 243, and then writing the pixel displacing correction parameters in the nonvolatile memory 88. In the present embodiment, the pixel displacing correction parameter calculation section 241 calculates the pixel displacing correction parameters for the image signals of the sub-pixels with respect to each of the color components of R, G, and B.

Figure 5:
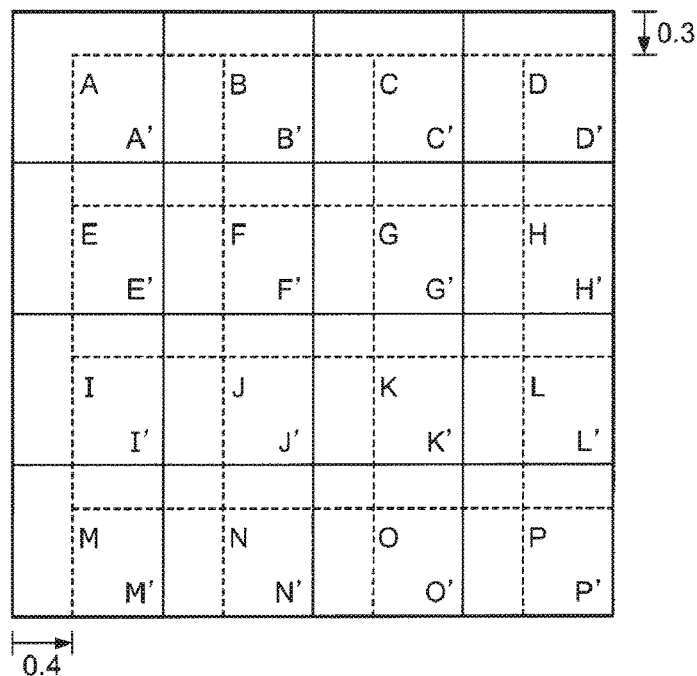
FIG. 5 is a diagram illustrating a configuration of position shifts of display positions of the sub-pixels in a display surface.

Here, the pixel displacing correction in the present embodiment will be described with reference to FIG. 5 and FIG. 6. FIG. 5 illustrates the sub-pixels A through P of one color component (e.g., the R component) displayed at the respective reference positions in the screen SCR without causing the position shifts. Further, FIG. 5 illustrates the sub-pixels A' through P', which should have originally been displayed as the sub-pixels A though P, but have the display positions shifted downward as much as 0.3 pixel, and rightward as much as 0.4 pixel from the reference positions. Further, in FIG. 5, the boundaries between the sub-pixels adjacent to each other in the sub-pixels A through P are indicated by the solid lines, and the boundaries between the sub-pixels adjacent to each other in the sub-pixels A' through P' are indicated by the dotted lines. The information (in this case, the information of downward as much as 0.3 pixel, and rightward as much as 0.4 pixel) representing the position shift of the display position of the sub-pixels A' through P' from the display positions (i.e., the reference positions) of the sub-pixels A through P in FIG. 5 is stored in the position shift storage section 22 for each of the sub-pixels.

Figure 6:
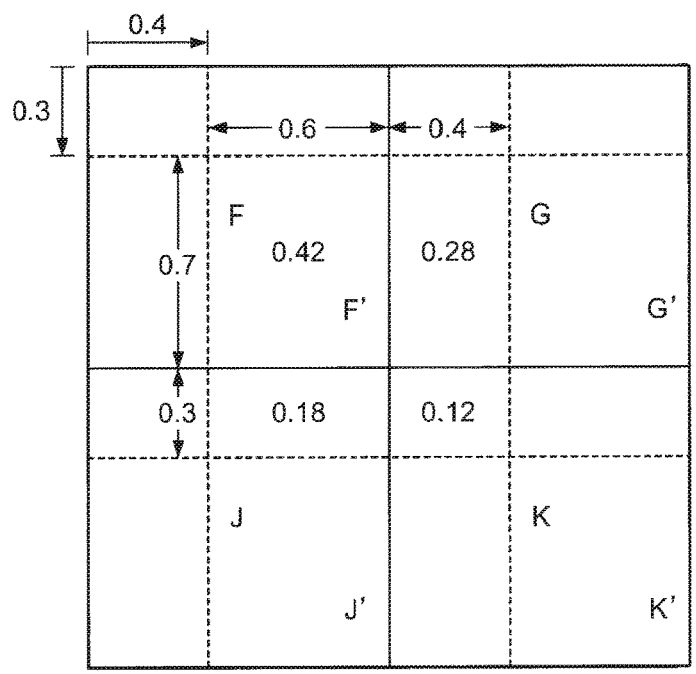
FIG. 6 is a diagram for explaining a pixel displacing correction performed in the image signal correction section.

FIG. 6 is a diagram showing the sub-pixels F, G, J, and K, and the sub-pixels F', G', J', and K' in FIG. 5 in an enlarged manner. In FIG. 6, when the original image signal for the sub-pixel F is supplied to the R liquid crystal panel 130R as the image signal for the sub-pixel F, the sub-pixel corresponding to the image signal is displayed on the screen SCR as the sub-pixel F'. In order to eliminate the position shifts as the whole image, it is sufficient to supply an image signal representing the luminance of the area occupied by the sub-pixel F' in the display target image to the R liquid crystal panel 130R as the sub-pixel signal for the sub-pixel F. In the present embodiment, the luminance of the area occupied by the sub-pixel F' is calculated using an interpolation operation based on a bilinear method described below. It should be noted that the algorithm of the interpolation operation is not limited to the bilinear method, but it is also possible to use an algorithm such as a nearest neighbor method or a bi-cubic method.

In FIG. 6, the sub-pixel F' obtained by shifting the sub-pixel F rightward as much as 0.4 pixel and downward as much as 0.3 pixel occupies the area 0.6×0.7=0.42 times of the entire area of the sub-pixel F, the area 0.4×0.7=0.28 times of the entire area of the sub-pixel G, the area 0.6× 0.3=0.18 times of the entire area of the sub-pixel J, and the area 0.4×0.3=0.12 times of the entire area of the sub-pixel K.

Therefore, it is sufficient to supply the signal representing the sum of the luminance 0.42 times of the luminance of the sub-pixel F, the luminance 0.28 times of the luminance of the sub-pixel G, the luminance 0.18 times of the luminance of the sub-pixel J, and the luminance 0.12 times of the luminance of the sub-pixel K to the R liquid crystal panel 130R as the image signal for the sub-pixel F. According to this process, the sub-pixel F' represented by the image signal is displayed in the area of the sub-pixel F' in the screen SCR due to the position shift. In other words, the image of the R component having no position shift with respect to the display target image is displayed on the display surface as a result.

In general, the pixel displacing correction is performed in the following manner. Specifically, in the case in which the luminance of the sub-pixel located on the upper left side out of the four sub-pixels straddled by the sub-pixel F', which is one displaced sub-pixel, is defined as r0, the luminance of the sub-pixel located on the upper right side is defined as r1, the luminance of the sub-pixel located on the lower left side is defined as r2, the luminance of the sub-pixel located on the lower right side is defined as r3, the rightward component of the position shift is defined as α pixel, and the downward component is defined as β pixel in the display surface including the sub-pixels A through P located at the respective reference positions, the luminance Rx of the image signal for the sub-pixel F is calculated using the following formula.

$$Rx = (1-\alpha)\cdot(1-\beta)\cdot r0 + \alpha\cdot(1-\beta)\cdot r1 + (1-\alpha)\cdot\beta\cdot r2 + \alpha\cdot\beta\cdot r3 \quad (1)$$
$$= k0\cdot r0 + k1\cdot r1 + k2\cdot r2 + k3\cdot r3$$

where k0 through k3 are as follows:

$$k0 = (1-\alpha)\cdot(1-\beta) \quad (2)$$
$$k1 = \alpha\cdot(1-\beta)$$
$$k2 = (1-\alpha)\cdot\beta$$
$$k3 = \alpha\cdot\beta$$

The same applies to other sub-pixels. In other wards, the luminance of each of the areas occupied by the respective sub-pixels A' through P' is obtained by the interpolation operation, and the image signals each representing the luminance of the corresponding one of these areas are supplied to the liquid crystal panel 130R for the R component as the image signals for the sub-pixels A through P. As described above, by supplying the liquid crystal panel 130R for the R component with the image signal obtained by shifting each of the sub-pixels of the display target image in the opposite direction (upward as much as 0.3 pixel and leftward as much as 0.4 pixel, in this example) to the position shift direction of each of the sub-pixels, and as much as the same distance as the distance of the position shift, it is possible to display substantially the same image as the image not displaced with respect to the display target image constituted by the sub-pixels A through P on the screen SCR.

Although the description is presented hereinabove using the R component as an example, the pixel displacing correction with respect to other color components is substantially the same.

The pixel displacing correction parameter calculation section 241 calculates the pixel displacing correction parameters necessary for execution of such a pixel displacing correction, namely the coefficients k0 through k3 (0.42, 0.28, 0.18, and 0.12 in the example described above) of the formula (2) described above, based on the shift amounts a, R stored in the position shift storage section 22 with respect to each of the sub-pixels of each of the color components of R, G, and B of the display target image, and then writes the pixel displacing correction parameters in the nonvolatile memory 88. In FIG. 7, the pixel displacing correction parameters written in the nonvolatile memory 88 in such a manner are illustrated in a matrix. For example, in the second row and the second column of the matrix shown in FIG. 7, there is described the formula of F'=0.42F+0.28G+0.18J+0.12K. In this formula, F, G, J, and K correspond to r0 through r3 in the formula (1) described above, and 0.42, 0.28, 0.18, and 0.12 correspond to the pixel displacing correction parameters k0 through k3, respectively.

Further, when displaying the image, the pixel displacing correction section 243 retrieves the pixel displacing correction parameters k0 through k3 corresponding to the sub-pixel from the nonvolatile memory 88 with respect to each of the sub-pixels of each of the color components. Then, the pixel displacing correction section 243 obtains the luminance values (r0 through r3 in the formula (1) described above) of the four sub-pixels, which are straddled by the sub-pixel after the positions have been shifted, based on the information representing the position shift of the sub-pixel stored in the position shift storage section 22, and then calculates the luminance Rx of the area occupied by the sub-pixel thus displaced using the product-sum operation of the formula (1) described above.

The specific process is as follows. As shown in FIG. 8, the position shift of an arbitrary sub-pixel X can be classified into four types. Those are a lower rightward position shift V0, a lower leftward position shift V1, an upper rightward position shift V2, and an upper leftward position shift V3.

In the case in which the lower rightward position shift V0 occurs in the sub-pixel X, the rightward component α of the position shift V0 is positive, and the downward component β thereof is positive. In this case, the pixel displacing correction section 243 determines that the four sub-pixels straddled by the area occupied by the sub-pixel X', namely the displaced sub-pixel X, are the sub-pixel X, a sub-pixel located on the right side of the sub-pixel X, a sub-pixel located on the lower side of the sub-pixel X, and a sub-pixel located on the lower right side of the sub-pixel X, and then performs the interpolation operation of the formula (1) described above using the image signals r0 through r3 of the four sub-pixels and the correction parameters k0 through k3 corresponding to the sub-pixel X to calculate the luminance Rx of the area occupied by the sub-pixel X' with the position shift.

The same applies to the case in which other position shifts V1 through V3 occur. The pixel displacing correction section 243 determines the direction of the position shift based on the rightward component α and the downward component β of the position shift, then determines the four sub-pixels straddled by the area occupied by the sub-pixel X' with the position shift based on the determination result of the position shift direction, and then calculates the luminance Rx of the area occupied by the sub-pixel X' with the position shift using the image signals r0 through r3 of the four sub-pixels and the correction parameters k0 through k3 corresponding to the sub-pixel X.

Then, the pixel displacing correction section 243 outputs the image signals representing the luminance values of the areas of the respective sub-pixels with the position shifts obtained in such a manner as the image signals of the respective sub-pixels. The processing content of the pixel displacing correction section 243 is described hereinabove.

Incidentally, in the pixel displacing correction described hereinabove, the sub-pixels located in the vicinity of the boundary of the effective display range in the display target image move to the outside of the effective display range, and the display luminance of the sub-pixels decreases in some cases. In this case, if the display luminance of the sub-pixels of other color components belonging to the same pixel remains, there is a problem that coloring occurs in the pixel. The problem will hereinafter be described in detail citing a specific example.

In FIG. 7, the image signal of the sub-pixel F of the R component is dispersed into the image signals of the sub-pixel F and the three sub-pixels adjacent to the sub-pixel F due to the pixel displacing correction, and the components of the image signal of the sub-pixel F dispersed into the image signals of these four sub-pixels express the luminance of the sub-pixel F on which the pixel displacing correction has been performed. Specifically, the component 0.12F included in the image signal of the sub-pixel A, the component 0.18F included in the image signal of the sub-pixel B, the component 0.28F included in the image signal of the sub-pixel E, and the component 0.42F included in the image signal of the sub-pixel F express the luminance of the sub-pixel F on which the pixel displacing correction has been performed.

Here, it is assumed that the sub-pixel F is the sub-pixel located on the upper left corner of the effective display range, and there is no parting pixel. In this case, since the sub-pixels E, A, and B are located outside the effective display range, the components 0.28F, 0.12F, and 0.18F included in the respective image signals of the sub-pixels E, A, and B are not displayed, and the display luminance of the sub-pixel F on which the pixel displacing correction has been performed decreases to the luminance 0.42 times of the original luminance represented by the image signal of the sub-pixel F. The proportion (0.42 in this example) of the display luminance (0.42F in this example) after the decrease to the display luminance (F in this example) before the decrease is hereinafter referred to as a luminance decreasing rate.

A similar luminance decrease also occurs in other sub-pixels located in the vicinity of the boundary of the effective display range. For example, regarding the sub-pixel G, since the component 0.12G dispersed into the image signal of the sub-pixel B due to the pixel displacing correction and the component 0.18G dispersed into the image signal of the sub-pixel C are not displayed, the display luminance of the sub-pixel G on which the pixel displacing correction has been performed decreases to the luminance 0.70 times of the original luminance represented by the image signal of the sub-pixel G. In this case, the luminance decreasing rate of the sub-pixel G is 0.70. Further, regarding the sub-pixel J, since the component 0.28J dispersed into the image signal of the sub-pixel I due to the pixel displacing correction and the component 0.12J dispersed into the image signal of the sub-pixel E are not displayed, the display luminance of the sub-pixel J on which the pixel displacing correction has been performed decreases to the luminance 0.60 times of the original luminance represented by the image signal of the sub-pixel J. In this case, the luminance decreasing rate of the sub-pixel J is 0.60.

Here, if the decrease in display luminance does not occur in the sub-pixels F, G, and J of other color components and constituting the same pixels as the sub-pixels F, G, and J, respectively, there occurs coloring, namely the phenomenon that those pixels are not displayed with the original colors represented by the respective image signals.

Therefore, in the present embodiment, by disposing the luminance decreasing rate calculation section 242 and the boundary correction section 244, the coloring is prevented from occurring.

Figures 9, 10:
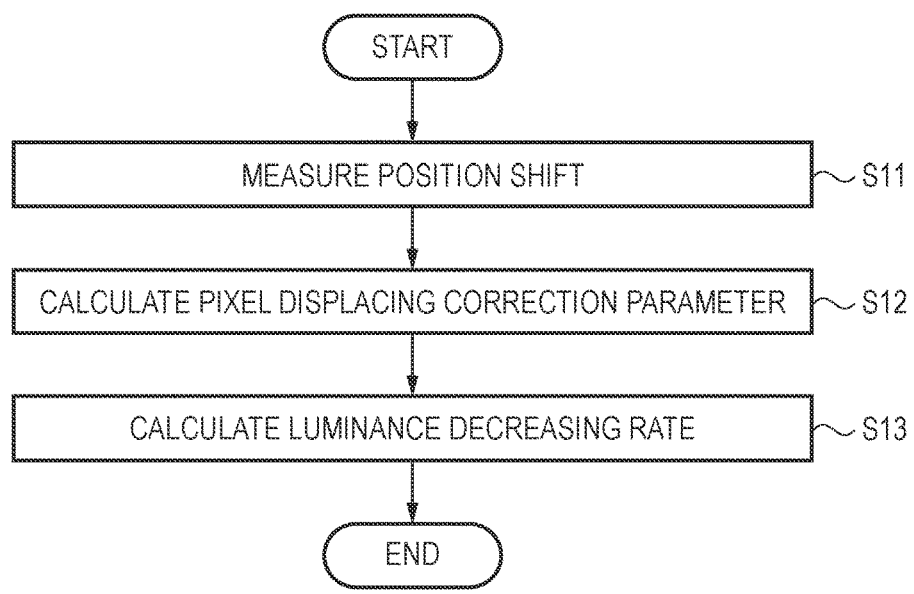
FIG. 9 is a diagram illustrating luminance decreasing rate of the sub-pixel due to the pixel displacing correction.
FIG. 10 is a flowchart showing an operation of the projector.

The luminance decreasing rate calculation section 242 is a device for calculating the luminance decreasing rate of the sub-pixel of the correction target color component, a part or the whole of which is placed outside the effective display range due to the pixel displacing correction. Specifically, the luminance decreasing rate calculation section 242 determines whether or not a part or the whole of the sub-pixel is placed outside the effective display range due to the pixel displacing correction based on the information representing the position shifts of the respective sub-pixels of the correction target color component stored in the nonvolatile memory 88. Then, in the case in which a part or the whole of the sub-pixel is placed outside the effective display range, the component to be dispersed to the outside of the effective display range due to the pixel displacing correction out of the image signal of the sub-pixel is obtained. In the case of the sub-pixel F shown in FIG. 7, the component 0.28F, the component 0.12F, and the component 0.18F dispersed into the sub-pixels E, A, and B located outside the effective display range are obtained. Then, the luminance decreasing rate calculation section 242 subtracts the sum (0.28+0.12+0.18=0.58 in the case of the sub-pixel F) of the weight coefficients of the image signal dispersed outside the effective display range due to the pixel displacing correction from 1, and thus calculates the luminance decreasing rate (1−0.58=0.42 in the case of the sub-pixel F) of the sub-pixel, a part or the whole of which has been placed outside the effective display range. The luminance decreasing rate calculation section 242 calculates the luminance decreasing rate with respect to each of the sub-pixels of the correction target color component of the display target image in such a manner, and then writes the result in the nonvolatile memory 88. FIG. 9 shows some of the luminance decreasing rates of the sub-pixels of the correction target color component to be calculated by the luminance decreasing rate calculation section 242 in such a manner. The luminance decreasing rate for each of the sub-pixels functions as a boundary correction parameter for identifying the sub-pixel to be the target of the boundary correction. Although in the example shown in FIG. 9, there is no sub-pixel having the luminance decreasing rate of 0, if the sub-pixel moves completely outside the effective display range due to the pixel displacing correction, the luminance decreasing rate of the sub-pixel becomes 0. In such a case, conspicuous coloring occurs in the display of the pixel including that sub-pixel. An advantage of the present embodiment is to prevent such conspicuous coloring from occurring.

The boundary correction section 244 is a device for performing the boundary correction for decreasing the luminance represented by the image signal of the sub-pixels of other color components in the pixel to which the sub-pixel belongs with respect to the sub-pixel having completely moved outside the effective display range due to the pixel displacing correction performed by the pixel displacing correction section 243. The specific process is as follows.

The boundary correction section 244 retrieves the luminance decreasing rate of each of the sub-pixels of, for example, the R component from the nonvolatile memory 88, and then determines whether or not the luminance decreasing rate of the sub-pixel is 0, namely whether or not the sub-pixel has completely moved outside the effective display range due to the pixel displacing correction. Then, in the case in which the luminance decreasing rate of a certain sub-pixel of the R component is 0, the boundary correction section 244 corrects the luminance represented by the image signals of other color components (the G component and the B component) of the pixel, to which the sub-pixel belongs, to the luminance value corresponding to black display. The same applies to other color components. In the case in which the luminance decreasing rate of a certain sub-pixel of the G component having been retrieved from the nonvolatile memory 88 is 0, the boundary correction section 244 corrects the luminance represented by the image signals of the R component and the B component of the pixel, to which the sub-pixel belongs, to the luminance value corresponding to the black display. Further, in the case in which the luminance decreasing rate of a certain sub-pixel of the B component having been retrieved from the nonvolatile memory 88 is 0, the boundary correction section 244 corrects the luminance represented by the image signals of the R component and the G component of the pixel, to which the sub-pixel belongs, to the luminance value corresponding to the black display.

Figure 11:
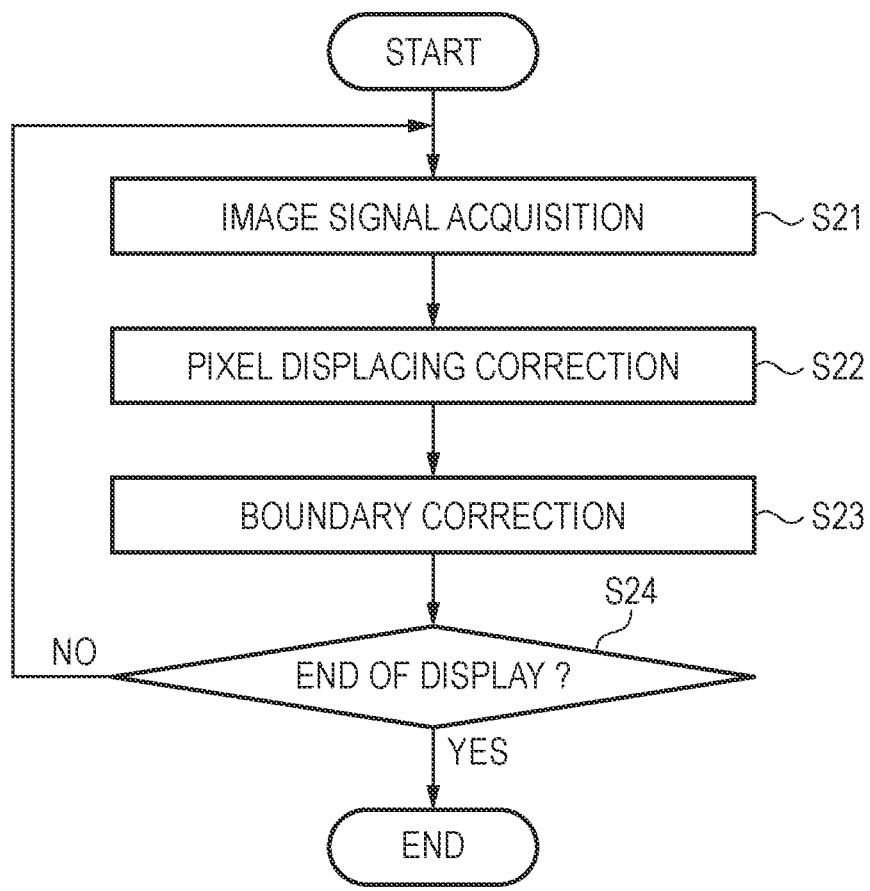
FIG. 11 is a flowchart showing an operation of the projector.

FIG. 10 and FIG. 11 are flowcharts each showing the operation of the projector 10 according to the present embodiment. When an adjustment instruction is provided to the projector 10 in the inspection in the factory shipment or a periodic inspection after the shipment, the projector 10 performs the process shown in FIG. 10.

Firstly, the projector 10 performs (step S11) the position shift measurement. Specifically, the projector 10 retrieves the image information corresponding to the pattern image stored in the pattern image storage section 40, and the projection section 100 projects the pattern image on the screen SCR. Then, after projecting the pattern image, in the projector 10, the sub-pixel position measurement section 30 shoots the projection image on the screen SCR to determine the display positions of the sub-pixels. Then, the image processing section 20 obtains the position shifts of the display positions of the sub-pixels determined by the sub-pixel position measurement section 30 with reference to the given reference positions in the projection image, and then stores the information representing the position shifts in the position shift storage section 22 (the nonvolatile memory 88). In the projector 10, the process described hereinabove is performed with respect to each of the color components of R, G, and B.

Then, in the projector 10, the pixel displacing correction parameter calculation section 241 calculates the pixel displacing correction parameters (see FIG. 7) of each of the sub-pixels based on the information representing the position shifts of the respective sub-pixels in the nonvolatile memory 88 with respect to each of the color components of R, G, and B, and then stores (step S12) the pixel displacing correction parameters thus calculated in the nonvolatile memory 88.

Then, in the projector 10, the luminance decreasing rate calculation section 242 calculates the luminance decreasing rate (see FIG. 9) caused by the pixel displacing correction with respect to each of the sub-pixels based on the information representing the position shifts of the respective sub-pixels in the nonvolatile memory 88 and the pixel displacing correction parameters with respect to the correction target color component, and then stores (step S13) the luminance decreasing rate thus calculated in the nonvolatile memory 88. The content of the process performed in accordance with the adjustment instruction is as described hereinabove.

Then, when the instruction of the image display is provided, the projector 10 performs the process shown in FIG. 11. Firstly, in the projector 10, the image signal correction section 24 obtains (step S21) the image signal corresponding to, for example, one frame (one vertical sync period) via the input image signal storage section 28.

Then, in the projector 10, the pixel displacing correction section 243 performs (step S22) the pixel displacing correction on the image signals of the respective sub-pixels using the information representing the position shifts of the respective sub-pixels in the nonvolatile memory 88 and the pixel displacing correction parameters with respect to each of the color components of R, G, and B.

Then, in the projector 10, the boundary correction section 244 performs (step S23) the boundary correction of the image signals. Specifically, the boundary correction section 244 retrieves the luminance decreasing rate of each of the sub-pixels of one color component from the nonvolatile memory 88, and then corrects the luminance represented by the image signals of other color components of the pixel, to which the sub-pixel belongs, to the luminance value corresponding to the black display with respect to the sub-pixel, the luminance decreasing rate of which is 0. The boundary correction section 244 performs the boundary correction on each of the color components of R, G, and B.

The boundary correction section 244 supplies the R liquid crystal panel 130R, the G liquid crystal panel 130G, and the B liquid crystal panel 130B with the image signal of each of the sub-pixels of each of the color components of R, G, and B on which the above process has been performed.

Then, in the projector 10, whether or not the instruction of ending the display has been provided is determined (step S24), and in the case in which the determination result is "NO," the process of the steps S21 through S23 is repeated, and in the case in which the determination result is "YES," the process is terminated.

Figure 12A:
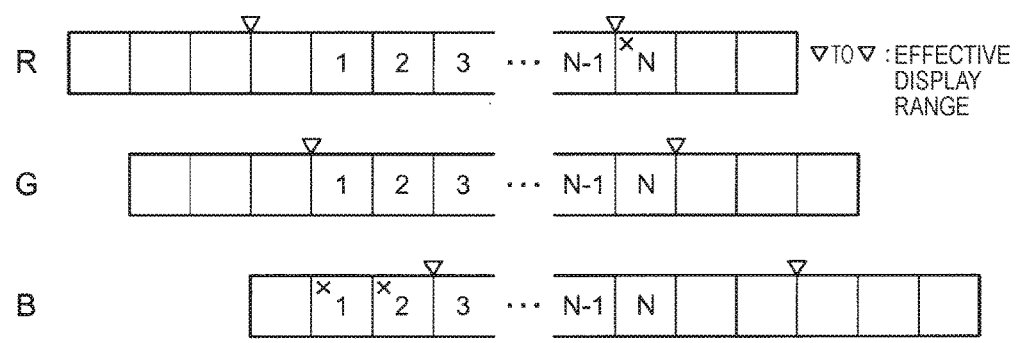
FIGS. 12A and 12B are diagrams showing an execution example of the pixel displacing correction and a boundary correction in the embodiment.
Figure 12B:
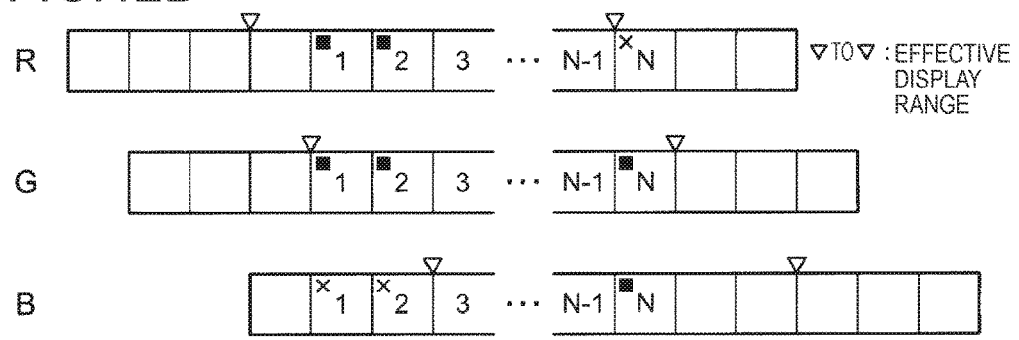

FIG. 12A shows an execution example of the pixel displacing correction in the present embodiment, and FIG. 12B shows an execution example of the boundary correction in the present embodiment. In these examples, no parting pixels are disposed outside the effective display range.

In the example shown in FIG. 12A, the display position of each of the sub-pixels of the G component is located at the reference position, the display position of each of the sub-pixels of the R component is shifted as much as 1 pixel leftward from the reference position, and the display position of each of the sub-pixels of the B component is shifted as much as 2 pixels rightward from the reference position. Therefore, the pixel displacing correction is performed with respect to the R component and the B component. As a result of the pixel displacing correction, the sub-pixel (the N-th sub-pixel) at the right end of the R component completely moves outside the effective display range, and is therefore not displayed, and the luminance decreasing rate of the N-th sub-pixel becomes 0. Further, the two sub-pixels (the first and second sub-pixels) at the left end of the B component completely move outside the effective display range, and are therefore not displayed, and the luminance decreasing rates of the first and second sub-pixels also become 0.

Therefore, in the boundary correction, as shown in FIG. 12B, the luminance represented by the image signals of the N-th sub-pixels of the G component and the B component is corrected to the luminance value corresponding to the black display, and the luminance represented by the image signals of the first and second sub-pixels of each of the R component and the G component is corrected to the luminance value corresponding to the black display. In such a manner as described above, the coloring is prevented from occurring at both of the right and left ends of the effective display range.

As described above, according to the present embodiment, in the case in which the sub-pixel moves completely outside the effective display range due to the pixel displacing correction, the luminance represented by the image signals of the sub-pixels of other color components of the pixel to which the sub-pixel belongs is corrected to the luminance value corresponding to the black display. Therefore, it is possible to prevent the coloring caused in the vicinity of the boundary of the effective display range due to the pixel displacing correction without using the parting pixels.

Although the embodiment of the invention is hereinabove described, it is possible to cite other embodiments of the invention than this embodiment. The following can be cited for example.

1. In the embodiment described above, the image signals of the sub-pixels of other color components of the pixel, to which the sub-pixel having completely moved outside the effective display range due to the pixel displacing correction belongs, are targeted in the boundary correction. However, instead of adopting such a configuration, it is also possible for the boundary correction to target the image signals of the sub-pixels of other color components of the pixel, to which the sub-pixel having the luminance decreasing rate due to the pixel displacing correction equal to or lower than a predetermined value, and a negligibly low value belongs.

2. In the embodiment described above, the luminance represented by the image signals of the sub-pixels targeted in the boundary correction is corrected to the luminance value corresponding to the black display. However, instead of adopting such a configuration, it is also possible to correct the luminance represented by the image signals of the sub-pixels targeted in the boundary correction to such a sufficiently low luminance value that coloring is not recognized. For example, it is possible to correct the luminance represented by the image signals of the sub-pixels targeted in the boundary correction to 10% or lower.

Figure 13A:
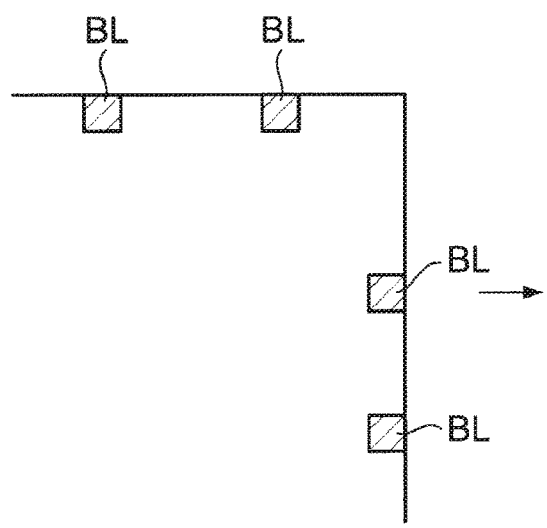
FIGS. 13A and 13B are diagrams showing an execution example of the pixel displacing correction and the boundary correction in another embodiment of the invention.
Figure 13B:
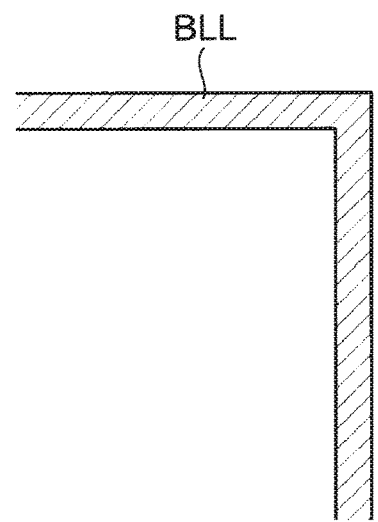
Figure 14:
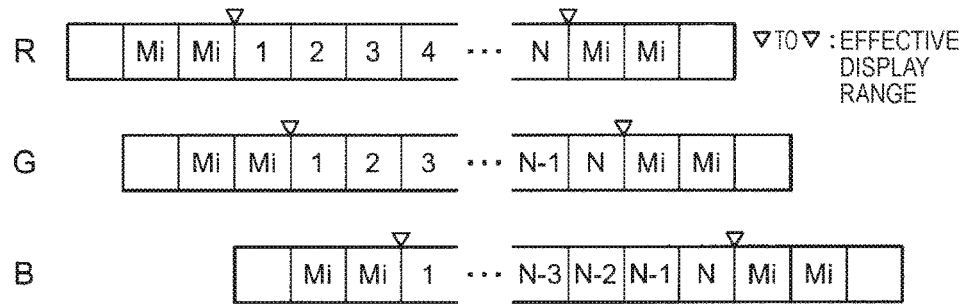
FIG. 14 is a diagram for explaining parting pixels provided to a liquid crystal panel.
Figure 15:
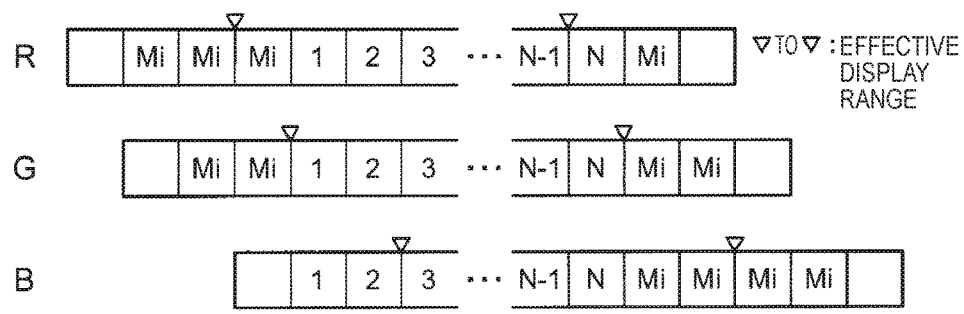
FIG. 15 is a diagram for explaining a pixel displacing correction performed using the parting pixels.
Figure 16:
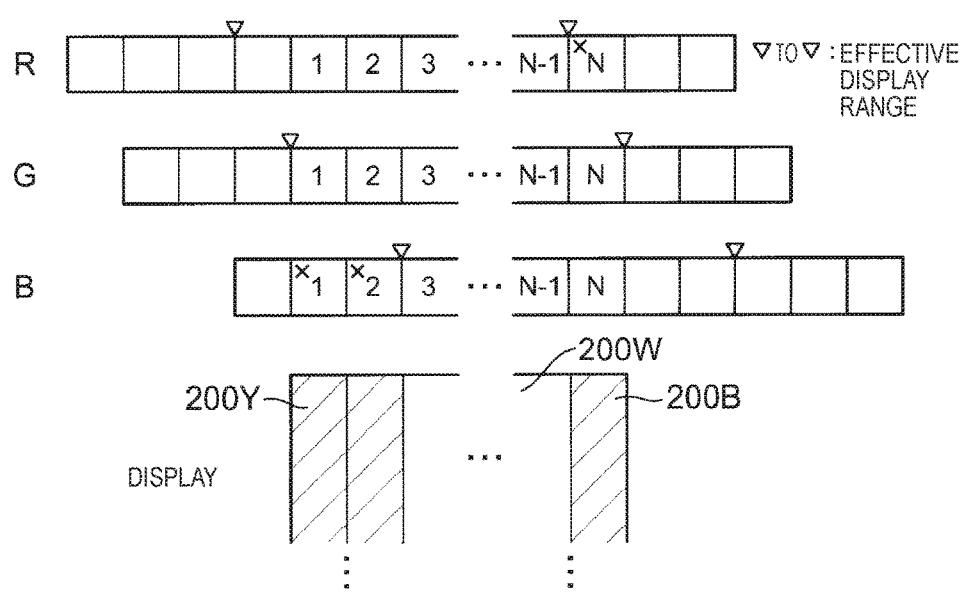
FIG. 16 is a diagram for explaining a problem arising in the case of performing the pixel displacing correction without providing the parting pixels.

3. In the embodiment described above, it is conceivable that the sub-pixels BL in the black display state discretely occur along the boundary line of the effective display range as illustrated in FIG. 13A as a result of the pixel displacing correction and the boundary correction. In such a case, it is also possible to display a black display area BLL shaped like a line connecting between the sub-pixels BL in the black display state as illustrated in FIG. 13B in the boundary correction.

4. In the embodiment described above, the color components of R, G, and B are targeted in the pixel displacing correction. However, instead of adopting such a configuration, it is also possible to arrange that one color component (e.g., the G component) is defined as a reference color component, the display positions of the sub-pixels of the reference color component are defined as reference positions, the position shifts of the display positions from the reference positions are obtained with respect to the sub-pixels of other color components to perform the pixel displacing correction.

5. In each of the embodiments described above, the sub-pixel position measurement section 30 measures the position shift of the display position with respect to all of the sub-pixels displayed on the screen SCR. However, it is also possible to arrange that the position shifts of the display positions are measured with respect to some of the sub-pixels displayed in the state of being scattered in the screen SCR as shown in Document 1, and the position shifts of the rest of the sub-pixels are obtained by the interpolation operation.

6. In each of the embodiments described above, it is arranged that the measurement of the position shifts, the calculation of the pixel displacing correction parameters, and the calculation of the luminance decreasing rate are performed at a timing preceding the image display such as an inspection in the factory shipment of the projector or a periodic inspection after the shipment, and the pixel displacing correction and the boundary correction are performed when performing the image display. However, it is also possible to arrange that the measurement of the position shifts is performed alone at a timing preceding the image display such as an inspection in the factory shipment of the projector or a periodic inspection after the shipment, and the calculation of the pixel displacing correction parameters, the calculation of the luminance decreasing rate, the pixel displacing correction and the boundary correction are performed when performing the image display. Further, in this case, when performing the calculation of the pixel displacing correction parameters, the calculation of the luminance decreasing rate, the pixel displacing correction, and the boundary correction, it is possible to use the RAM 84 instead of the nonvolatile memory 88 as a device for storing the information representing the position shifts, the pixel displacing correction parameters, and the luminance decreasing rate. In this case, although an amount of operation in the processing performed in the image processing increases, by using the RAM 84 as the storage device, speeding-up of the processing can be achieved.

7. In the embodiments described above, the boundary correction is performed on the image signals of the sub-pixels on which the pixel displacing correction has been performed. However, instead of doing the above, it is also possible to obtain those (hereinafter referred to as pixel displacing parameters with the boundary correction, for the sake of convenience) obtained by multiplying the pixel displacing correction parameters of the sub-pixels by the coefficients based on the luminance decreasing rate of the sub-pixels, then perform the pixel displacing correction using the pixel displacing correction parameters with the boundary correction, and omit the boundary correction.

8. Although in the embodiments, there are disposed the functions of the pixel displacing correction parameter calculation section 241 and the luminance decreasing rate calculation section 242 in the projector 10, it is also possible to arrange that a device realizing these functions is disposed outside the projector 10, then the device disposed outside calculates the pixel displacing correction parameters with the boundary correction described above with respect to the sub-pixels based on the information representing the position shifts in the position shift storage section 22, and then writes the result in the nonvolatile memory 88. In this case, in the projector 10, it is sufficient to perform only the pixel displacing correction on the image signals of the sub-pixels using the pixel displacing correction parameters with the boundary correction stored in the nonvolatile memory 88.

9. It is also possible to arrange that a program for realizing the function as the luminance decreasing rate calculation section 242 and the function as the boundary correction section 244 is generated, and the program is installed and used in the projector 10 which is not provided with the function as the luminance decreasing rate calculation section 242 and the function as the boundary correction section 244, but is provided with the function as the pixel displacing correction parameter calculation section 241 and the function as the pixel displacing correction section 243.

10. Although in the embodiments described above, one pixel is composed of the three sub-pixels of the respective color components, the invention is not limited to this configuration. The number of the color components constituting one pixel can be two or no smaller than four.

11. Although in the embodiments described above, the liquid crystal panels are used as the light modulation sections, the invention is not limited thereto. It is also possible to adopt, for example, Digital Light Processing (DLP, a registered trademark), and Liquid Crystal On Silicon (LCOS) as the light modulation section.

12. Although in the embodiments described above, the invention is described as the image display device and the method of controlling the image display device, the invention is not limited to these aspects. For example, the invention can also be implemented as a program in which the procedure for realizing the control method according to the invention is described, or in an aspect of distributing a recording medium on which the program is recorded.

What is claimed is:

1. An image display device comprising:
an image display having a plurality of light modulators corresponding respectively to color components, adapted to output light beams, which are modulated by image signals of a plurality of sub-pixels corresponding respectively to the color components and belonging to each of pixels constituting a display target image, by the respective light modulators, adapted to combine output light beams of the respective light modulators with each other, and adapted to display images formed of the respective color components on a display surface so as to overlap each other; and
an image signal correction unit adapted to perform a pixel displacing correction adapted to shift a position of the sub-pixel in the display target image on the image signal of the sub-pixel supplied to at least one of the light modulators to thereby compensate position shifts of the display positions of the sub-pixels constituting the images of the respective color components to be displayed on the display surface with respect to a reference position,
wherein the image signal correction unit having a boundary correction unit adapted to perform a boundary correction of decreasing luminance represented by the image signal of a sub-pixel of another color component of the pixel, to which the sub-pixel belongs, with respect to the sub-pixel, which moves outside an effective display range due to the pixel displacing correction.

2. The image display device according to claim 1, wherein the boundary correction unit decreases the luminance represented by the image signal of the sub-pixel of another color component of the pixel, to which the sub-pixel moving completely outside the effective display range to have the display luminance equal to 0 due to the pixel displacing correction belongs, to a level no higher than 10%.

3. The image display device according to claim 1, wherein the boundary correction unit corrects the luminance represented by the image signal of the sub-pixel of another color component of the pixel, to which the sub-pixel moving completely outside the effective display range to have the display luminance equal to 0 due to the pixel displacing correction belongs, to a luminance value corresponding to black display.

4. A method of controlling an image display device having a plurality of light modulators corresponding respectively to color components, adapted to output light beams, which are modulated by image signals of a plurality of sub-pixels corresponding respectively to the color components and belonging to each of pixels constituting a display target image, by the respective light modulators, adapted to combine output light beams of the respective light modulators with each other, and adapted to display images formed of the respective color components on a display surface so as to overlap each other, the method comprising:

obtaining a position shift of a display position from a reference position in the display surface of the sub-pixel of the display target image;

making the image display device perform a process of performing a pixel displacing correction adapted to shift a position of the sub-pixel in the display target image on the image signal of the sub-pixel supplied to at least one of the light modulators to thereby compensate position shifts of the display positions of the sub-pixels constituting the images of the respective color components to be displayed on the display surface with respect to a reference position; and making the image display device perform a boundary correction of decreasing luminance represented by the image signal of a sub-pixel of another color component of the pixel, to which the sub-pixel belongs, with respect to the sub-pixel, which moves outside an effective display range due to the pixel displacing correction.

5. The method of controlling an image display device according to claim 4, wherein in the making the image display device perform the boundary correction, the luminance represented by the image signal of the sub-pixel of another color component of the pixel, to which the sub-pixel moving completely outside the effective display range to have the display luminance equal to 0 due to the pixel displacing correction belongs, is decreased to a level no higher than 10%.

6. The method of controlling an image display device according to claim 4, wherein in the making the image display device perform the boundary correction, the luminance represented by the image signal of the sub-pixel of another color component of the pixel, to which the sub-pixel moving completely outside the effective display range to have the display luminance equal to 0 due to the pixel displacing correction belongs, is corrected to a luminance value corresponding to black display.

* * * * *